United States Patent
Tang et al.

(10) Patent No.: US 9,344,017 B2
(45) Date of Patent: May 17, 2016

(54) DRIVING CIRCUIT AND DRIVING METHOD THEREOF

(71) Applicant: DELTA ELECTRONICS, INC., Taoyuan Hsien (TW)

(72) Inventors: Chung-Hung Tang, Taoyuan Hsien (TW); Chien-Sheng Lin, Taoyuan Hsien (TW); Chin-Fa Chiu, Taoyuan Hsien (TW); Chun-Lung Chiu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 58 days.

(21) Appl. No.: 14/501,659

(22) Filed: Sep. 30, 2014

(65) Prior Publication Data
US 2015/0244295 A1    Aug. 27, 2015

(30) Foreign Application Priority Data
Feb. 21, 2014   (TW) .............................. 103105777 A

(51) Int. Cl.
*H02P 6/00* (2006.01)
*H02P 6/08* (2016.01)
*H02P 25/18* (2006.01)

(52) U.S. Cl.
CPC ................ *H02P 6/008* (2013.01); *H02P 6/085* (2013.01); *H02P 25/188* (2013.01)

(58) Field of Classification Search
CPC ............ H02P 6/008; H02P 6/085; H02P 7/00
USPC .............. 318/400.01, 400.14, 400.15, 400.32, 318/400.4, 700, 701, 721, 779, 799, 800, 318/801, 727, 268, 266, 280, 286, 466, 55, 318/59, 66, 68, 163; 361/679.48; 446/178; 454/15, 101, 102; 123/392
See application file for complete search history.

(56) References Cited

U.S. PATENT DOCUMENTS

| | | | | |
|---|---|---|---|---|
| 5,796,234 A | * | 8/1998 | Vrionis ..................... | H02P 1/42 318/700 |
| 6,008,603 A | * | 12/1999 | Jones ..................... | H02P 25/026 318/400.32 |
| 6,545,438 B1 | * | 4/2003 | Mays, II .................. | H02P 6/08 318/400.01 |

* cited by examiner

*Primary Examiner* — Antony M Paul
(74) *Attorney, Agent, or Firm* — Muncy, Geissler, Olds & Lowe, P.C.

(57) ABSTRACT

A driving circuit drives a motor containing a first coil and a second coil. The driving circuit includes a switching unit, an operation unit and a control unit. The switching unit receives a switching signal from the control unit for driving the motor. The control unit detects the rotation speed of the motor. When the rotation speed of the motor is greater than a predetermined rotation speed, the control unit outputs a first operation signal to the operation unit to couple the first terminals of the first and second coils and couple the second terminals of the first and second coils. When the rotation speed of the motor is less than or equal to the predetermined rotational speed, the control unit outputs a second operation signal to the operation unit to couple the second terminal of the first coil to the first terminal of the second coil.

10 Claims, 8 Drawing Sheets

DRIVING CIRCUIT AND DRIVING METHOD THEREOF

CROSS REFERENCE TO RELATED APPLICATIONS

This Non-provisional application claims priority under 35 U.S.C. §119(a) on Patent Application No(s). 103105777 filed in Taiwan, Republic of China on Feb. 21, 2014, the entire contents of which are hereby incorporated by reference.

BACKGROUND OF THE INVENTION

1. Field of Invention

The present invention relates to a driving circuit and a driving method thereof, and in particular, to a driving circuit of a single-phase brushless DC fan and a driving method thereof.

2. Related Art

Motors are a commonly used device for transforming electricity to mechanical energy. The motor has been applied to many products such as fans, optical disk drives, hard disk drives, optical devices, vehicle devices, computer apparatuses, appliances and mechanical apparatuses.

As the progressive of technologies, the existing motors can provides high power outputs so as to operating at high speed. However, when the rotation speed of the motor is adjusted down to the range of medium-low rotation speed, the unnecessary power loss will exist.

Therefore, it is an important subject to provide a driving circuit of a single-phase brushless DC fan and a driving method thereof, which have lower power consumption during the operation at medium-low rotation speed.

SUMMARY OF THE INVENTION

In view of the foregoing subject, an objective of the present invention is to provide a driving circuit of a single-phase brushless DC fan and a driving method thereof, which have lower power consumption during the operation at medium-low rotation speed.

To achieve the above objective, the present invention discloses a driving circuit for a single-phase brushless DC fan, which is used for driving a motor containing a first coil and a second coil. Each of the first coil and the second coil comprises a first terminal and a second terminal. The driving circuit includes a switching unit, an operation unit and a control unit. The switching unit is coupled with the first coil and the second coil. The operation unit is coupled with the switching unit, the first coil and the second coil. The control unit generates a switching signal, and the switching unit receives the switching signal for driving the motor. The control unit detects a rotation speed of the motor. When the rotation speed of the motor is greater than a predetermined rotation speed, the control unit outputs a first operation signal to the operation unit so that the first terminal of the first coil is coupled to the first terminal of the second coil and the second terminal of the first coil is coupled to the second terminal of the second coil. Otherwise, when the rotation speed of the motor is less than or equal to the predetermined rotational speed, the control unit outputs a second operation signal to the operation unit so that the operation unit couples the second terminal of the first coil to the first terminal of the second coil.

To achieve the above objective, the present invention also discloses a driving method applied to a driving circuit of a single-phase brushless DC fan, which is used for driving a motor containing a first coil and a second coil. Each of the first coil and the second coil includes a first terminal and a second terminal. The driving circuit includes a switching unit, an operation unit and a control unit. The switching unit is coupled with the first coil and the second coil. The operation unit is coupled with the switching unit, the first coil and the second coil. The control unit generates a switching signal, and the switching unit receives the switching signal for driving the motor. The control unit detects a rotation speed of the motor. The driving method includes the steps of: when the rotation speed of the motor is greater than a predetermined rotation speed, outputting a first operation signal from the control unit to the operation unit so that the first terminal of the first coil is coupled to the first terminal of the second coil and the second terminal of the first coil is coupled to the second terminal of the second coil; and when the rotation speed of the motor is less than or equal to the predetermined rotational speed, outputting a second operation signal from the control unit to the operation unit so that the operation unit couples the second terminal of the first coil to the first terminal of the second coil.

In one embodiment, the switching unit has a first switching element, a second switching element, a third switching element and a fourth switching element, and the switching signal controls to turn on the first switching element and the fourth switching element and to turn off the second switching element and the third switching element.

In one embodiment, the switching signal can also control to turn off the first switching element and the fourth switching element and to turn on the second switching element and the third switching element.

In one embodiment, the switching unit has a first switching element, a second switching element, a third switching element, a fourth switching element, a fifth switching element, a sixth switching element, a seventh switching element and an eighth switching element. The switching signal controls to turn on the first switching element, the third switching element, the sixth switching element, and the eighth switching element and to turn off the second switching element, the fourth switching element, the fifth switching element, and the seventh switching element.

In one embodiment, the switching signal can also control to turn off the first switching element, the third switching element, the sixth switching element, and the eighth switching element and to turn on the second switching element, the fourth switching element, the fifth switching element, and the seventh switching element.

As mentioned above, in the driving circuit and driving method of the invention, when the detected rotation speed of the motor is greater than a predetermined rotation speed, the control unit controls the operation unit so as to couple the first terminal of the first coil to the first terminal of the second coil and to couple the second terminal of the first coil to the second terminal of the second coil (applied to high rotation speed). Alternatively, when the detected rotation speed of the motor is less than or equal to the predetermined rotational speed, the control unit controls the operation unit so as to couple the second terminal of the first coil to the first terminal of the second coil (providing lower power output to be applied to medium-low rotation speed). Accordingly, the invention can change the coupling arrangement of the coils while the motor is operated at a medium-low rotation speed, thereby further reducing the power consumption so as to achieve the goal of power saving.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
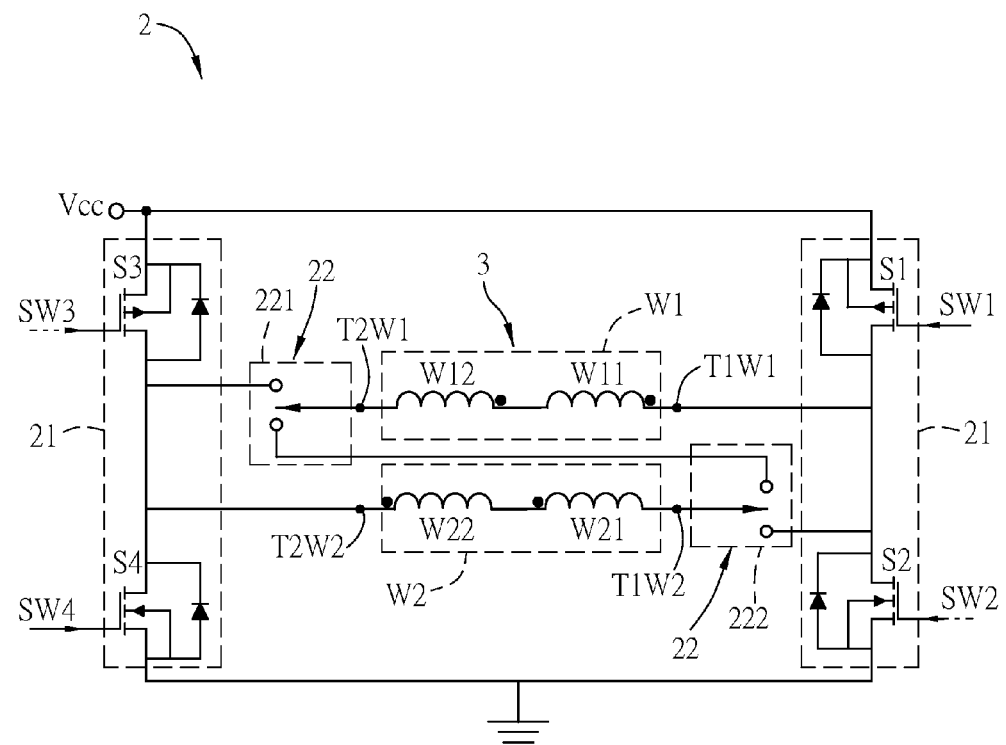
FIG. 1A is a circuit diagram of a driving circuit for driving a motor according to a preferred embodiment of the invention.
Figure 1B:
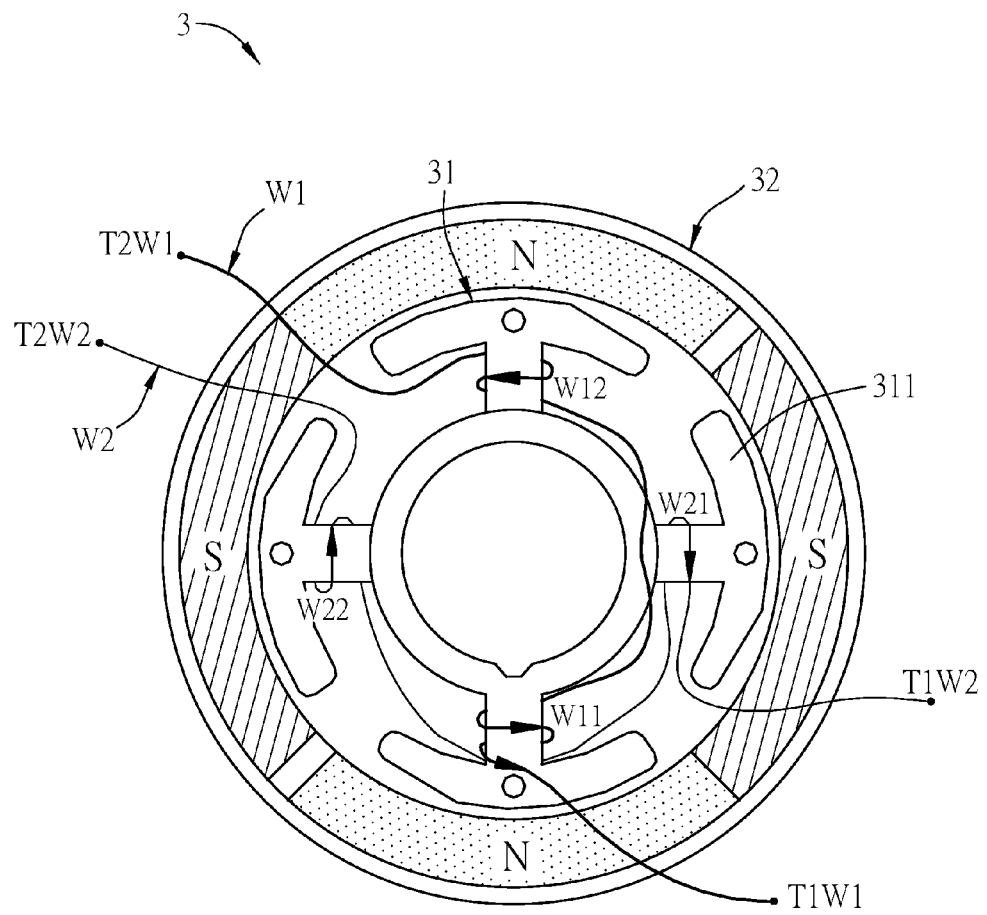
FIG. 1B is a schematic diagram of the motor of FIG. 1A.
Figure 1C:
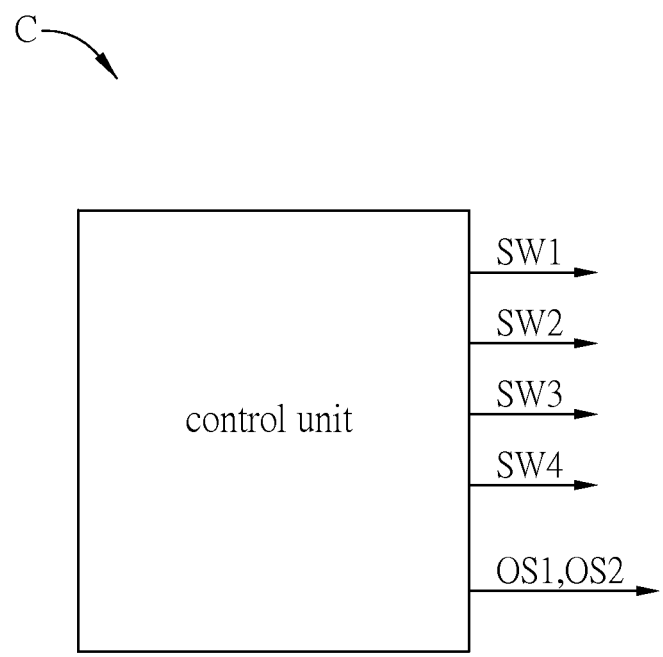
FIG. 1C is a schematic diagram of a control unit.

FIG. 1A is a circuit diagram of a driving circuit 2 for driving a motor 3 according to a preferred embodiment of the invention, FIG. 1B is a schematic diagram of the motor 3 of FIG. 1A, and FIG. 1C is a schematic diagram of a control unit C.

The motor 3 is a single-phase brushless DC motor and includes a stator structure 31, a rotor structure 32, a first coil W1 and a second coil W2. The rotor structure 32 is disposed around the outside of the stator structure 31. The first coil W1 and the second coil W2 are wound on a plurality of pole arms 311 of the stator structure 31 (the number of turns of the coils shown in the figures is for an illustration only), and are disposed corresponding to the magnet poles N and S of the rotor structure 32. In this embodiment, the motor 3 is a four-pole motor (with four pole arms 311). In addition, the first coil W1 has two sub-coils W11 and W12 winding on two odd pole arms 311, and the second coil W2 has two sub-coils W21 and W22 winding on two even pole arms 311. The sub-coils W11 and W12 are wound on the two odd pole arms 311 along a first direction, and provide two ends function as a first terminal T1W1 and a second terminal T2W1 of the first coil W1. The sub-coils W21 and W22 are wound on the two even pole arms 311 along a second direction, and provide two ends function as a first terminal T1W2 and a second terminal T2W2 of the second coil W2. Of course, in other embodiments, if the motor 3 is an eight-pole motor, the first coil W1 can have four sub-coils winding on four odd pole arms 311, and the second coil W2 can have four sub-coils winding on four even pole arms 311. The type of the motor is not limited in this invention.

The driving circuit 2 includes a switching unit 21, an operation unit 22 and a control unit C.

The switching unit 21 is coupled to the first coil W1 and the second coil W2. In this embodiment, the switching unit 21 has a first switching element S1, a second switching element S2, a third switching element S3 and a fourth switching element S4. In this case, the first switching element S1 and the third switching element S3 are PMOS transistors, and the second switching element S2 and the fourth switching element S4 are NMOS transistors. The switching elements, the first coil W1 and the second coil W2 form an "H-bridge-like" structure. Of course, in other aspects, each of the first switching element S1, the second switching element S2, the third switching element S3 and the fourth switching element S4 can be individually a PMOS, NMOS or BJT transistor.

The sources of the first switching element S1 and the third switching element S3 are connected to a voltage Vcc, and the sources of the second switching element S2 and the fourth switching element S4 are grounded. The drains of the first switching element S1 and the second switching element S2 are connected and directly coupled to the first terminal T1W1 of the first coil W1, and the drains of the third switching element S3 and the fourth switching element S4 are connected and directly coupled to the second terminal T2W2 of the second coil W2. The gate of the first switching element S1 receives a switching signal SW1, the gate of the second switching element S2 receives a switching signal SW2, the gate of the third switching element S3 receives a switching signal SW3, and the gate of the fourth switching element S4 receives a switching signal SW4.

The operation unit 22 is coupled to the switching unit 21, the first coil W1 and the second coil W2. In this embodiment, the operation unit 22 has a first operation element 221 and a second operation element 222. The first operation element 221 is coupled between the first coil W1 and the switching unit 21 or between the first coil W1 and the second operation element 222. The second operation element 222 is coupled between the second coil W2 and the switching unit 21 or between the second coil W2 and the first operation element 221. In this case, the first operation element 221 and the second operation element 222 are a dual-throw switch, which can be composed of relays or a composition of MOS transistors and/or BJT transistors. This invention is not limited thereto.

The control unit C can generate a switching signal, and the switching unit 21 receives the switching signal so as to control the operation of the motor 3. Herein, the switching signal includes the switching signals SW1-SW4 for correspondingly controlling the first switching element S1, the second switching element S2, the third switching element S3 and the fourth switching element S4, respectively. In addition, the switching signals can contain the PWM (pulse width modulation) function for modulating the rotation speed of the motor 3. In practice, when the duty cycle of the switching signal reaches 100%, the motor will operate at full speed and the rotation speed of the motor can be properly slow down by adjusting the duty cycle according to the actual need. For example, the duty cycle thereof can be adjusted to 80% or 60% so as to decrease the rotation speed of the motor 3.

The control unit C detects the rotation speed of the motor 3. The control unit C may include a hall sensor for sensing the magnet pole N or S of the rotor structure 32 so as to determine the rotation speed of the motor 3. In other aspects, it is also applicable to measure the current value of the first coil W1 or the second coil W2 and to feedback the measured result to the control unit C for determining the rotation speed of the motor 3. Of course, this invention does not limit the method for detecting the rotation speed of the motor 3, and any available method capable of actually detecting the rotation speed of the motor 3 is considerable.

The control unit C can be composed of a digital circuit (e.g. an IC) or an analog circuit. The IC is, for example, a microprocessor, an MCU, a FPGA or CPLD, or an ASIC, and this invention is not limited. In this embodiment, the control unit C is set with a predetermined rotation speed R for determining whether the motor 3 is operated at high rotation speed or medium-low rotation speed.

Figure 2A:
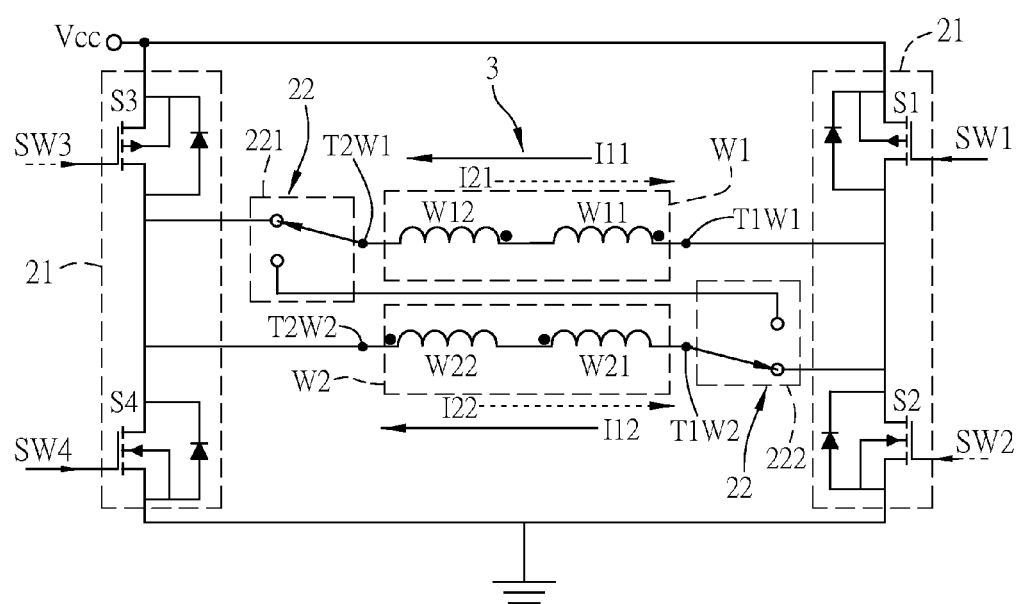
FIG. 2A is a circuit diagram of the motor shown in FIG. 1A as the rotation speed of the motor is greater than a predetermined rotation speed.
Figure 2B:
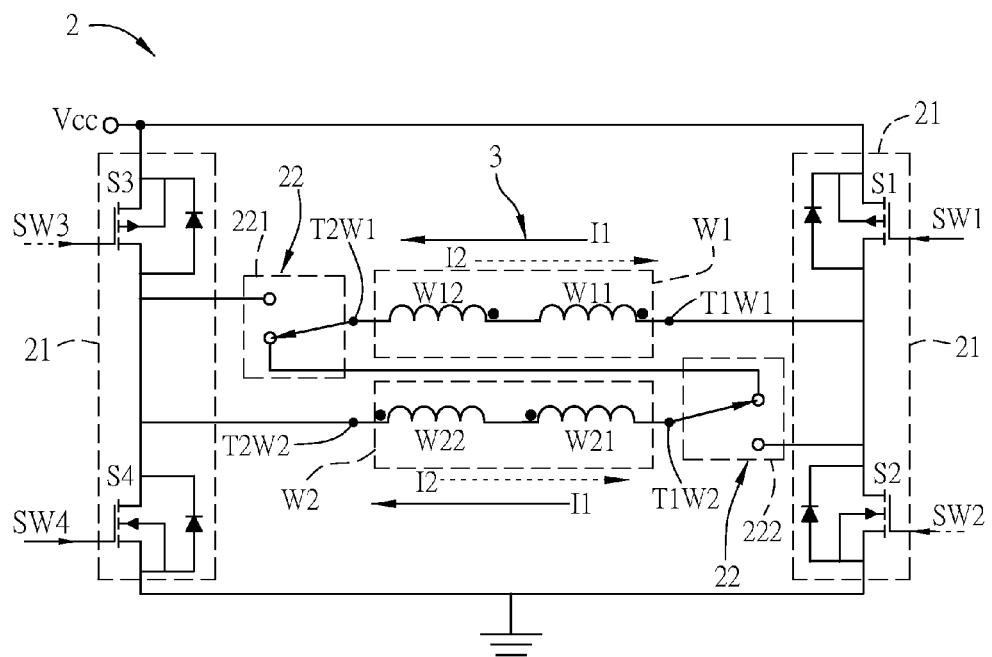
FIG. 2B is a circuit diagram of the motor shown in FIG. 1A as the rotation speed of the motor is less than or equal to a predetermined rotation speed.

FIG. 2A is a circuit diagram of the motor 3 shown in FIG. 1A as the rotation speed of the motor 3 is greater than the predetermined rotation speed R, and FIG. 2B is a circuit diagram of the motor 3 shown in FIG. 1A as the rotation speed of the motor 3 is less than or equal to the predetermined rotation speed R.

When the rotation speed of the motor 3 is greater than the predetermined rotation speed R, the control unit C outputs a first operation signal OS1 to the operation unit 22. Then, the operation unit 22 controls to couple the first terminal T1W1 of the first coil W1 to the first terminal T1W2 of the second coil W2 and to couple the second terminal T2W1 of the first coil W1 to the second terminal T2W2 of the second coil W2. In this embodiment, as shown in FIG. 2A, when the rotation speed of the motor 3 is greater than the predetermined rotation speed R, the first operation element 221 and the second operation element 222 are switched according to the first operation signal OS1, so that the first terminal T1W1 of the first coil W1 is coupled to the first terminal T1W2 of the second coil W2 and the second terminal T2W1 of the first coil W1 is coupled to the second terminal T2W2 of the second coil W2. Accordingly, when the switching signals SW1 and SW4 control to turn on the first switching element S1 and the fourth switching element S4, and the switching signals SW2 and SW3 control to turn off the second switching element S2 and the third switching element S3, the current I11 is provided from the voltage Vcc and then grounded through the first switching element S1, the first coil W1, the first operation element 221 and the fourth switching element S4. Alternatively, when the switching signals SW1 and SW4 control to turn off the first switching element S1 and the fourth switching element S4, and the switching signals SW2 and SW3 control to turn on the second switching element S2 and the third switching element S3, the current I21 is provided from the voltage Vcc and then grounded through the third switching element S3, the first operation element 221, the first coil W1 and the second switching element S2. In addition, the current I22 is provided from the voltage Vcc and then grounded through the third switching element S3, the second coil W2, the second operation element 222 and the second switching element S2. In this configuration, the motor 3 can provide high power output to be applied to high rotation speed operation.

When the rotation speed of the motor 3 is less than or equal to the predetermined rotation speed R, the control unit C outputs a second operation signal OS2 to the operation unit 22. Then, the operation unit 22 controls to couple the second terminal T2W1 of the first coil W1 to the first terminal T1W2 of the second coil W2. In this embodiment, as shown in FIG. 2B, when the rotation speed of the motor 3 is less than or equal to the predetermined rotation speed R, the first operation element 221 and the second operation element 222 are switched according to the second operation signal OS2, so that the second terminal T2W1 of the first coil W1 is coupled to the first terminal T1W2 of the second coil W2. Accordingly, when the switching signals SW1 and SW4 control to turn on the first switching element S1 and the fourth switching element S4, and the switching signals SW2 and SW3 control to turn off the second switching element S2 and the third switching element S3, the current I1 is provided from the voltage Vcc and then grounded through the first switching element S1, the first coil W1, the first operation element 221, the second operation element 222, the second coil W2 and the fourth switching element S4. Alternatively, when the switching signals SW1 and SW4 control to turn off the first switching element S1 and the fourth switching element S4, and the switching signals SW2 and SW3 control to turn on the second switching element S2 and the third switching element S3, the current I2 is provided from the voltage Vcc and then grounded through the third switching element S3, the second coil W2, the second operation element 222, the first operation element 221, the first coil W1 and the second switching element S2. In this configuration, the motor 3 can provide lower power output to be applied to medium-low rotation speed operation.

To be noted, in order to keep the rotation direction of the motor 3, the current flowing through the first coil W1 and the second coil W2 must be maintained in the same current direction and time sequence. In more specific, the current I11 flowing through the first coil W1 of FIG. 2A and the current I1 flowing through the first coil W1 of FIG. 2B have the same current direction, and the current I21 flowing through the first coil W1 of FIG. 2A and the current I2 flowing through the first coil W1 of FIG. 2B have the same current direction. The current I22 flowing through the second coil W2 of FIG. 2A and the current I2 flowing through the second coil W2 of FIG. 2B have the same current direction, and the current I12 flowing through the second coil W2 of FIG. 2A and the current I1 flowing through the second coil W2 of FIG. 2B have the same current direction.

As mentioned above, the driving circuit 2 can drive the motor 3 including the first coil W1 and the second coil W2, and the motor 3 has a higher power output for high rotation speed operation and a lower power output for medium-low rotation speed operation. Thus, the driving circuit 2 provides a composite-mode driving method instead of a single-mode driving method. If the motor 3 is applied to a high rotation speed operation and thus needs a higher power output, the control unit C controls the operation unit 22 to coupe the first terminal T1W1 of the first coil W1 to the first terminal T1W2 of the second coil W2 and to couple the second terminal T2W1 of the first coil W1 to the second terminal T2W2 of the second coil W2. This configuration can provide a high power output mode. If the motor 3 is applied to a medium-low rotation speed operation and thus needs a lower power output, the control unit C controls the operation unit 22 to coupe the second terminal T2W1 of the first coil W1 to the first terminal T1W2 of the second coil W2. This configuration can provide a low power output mode.

Figure 2C:
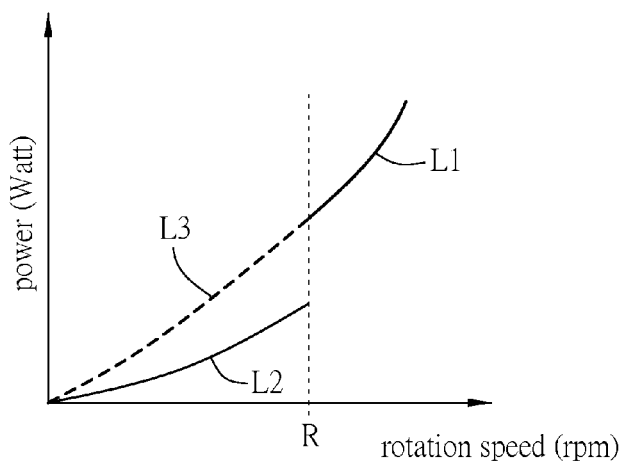
FIG. 2C is a schematic chart showing the rotation speed vs. power of the motor according to the embodiment of the invention.

FIG. 2C is a schematic chart showing the rotation speed vs. power of the motor 3 according to the embodiment of the invention. Wherein, the vertical axis represents the power (Watt), and the horizontal axis represents the rotation speed (rpm). With reference FIGS. 2A to 2C, when the rotation speed of the motor 3 is greater than the predetermined rotation speed R, the first coil W1 and the second coil W2 are properly coupled as mentioned above, and the relationship of rotation speed vs. power is indicated as the curve L1 as shown in FIG. 2C. When the rotation speed of the motor 3 is less than or equal to the predetermined rotation speed R, the first coil W1 and the second coil W2 are also properly coupled as mentioned above, and the relationship of rotation speed vs. power is indicated as the curve L2 as shown in FIG. 2C. When the rotation speed of the motor 3 is less than or equal to the predetermined rotation speed R, the control unit C controls the operation unit 22 to couple the second terminal T2W1 of the first coil W1 to the first terminal T1W2 of the second coil W2. Compared with the conventional motor, which never changes the terminal coupling therein (see the curve L3), the motor 3 of the embodiment has less power consumption under the same rotation speed condition, thereby achieving the goal of power saving.

Figure 3A:
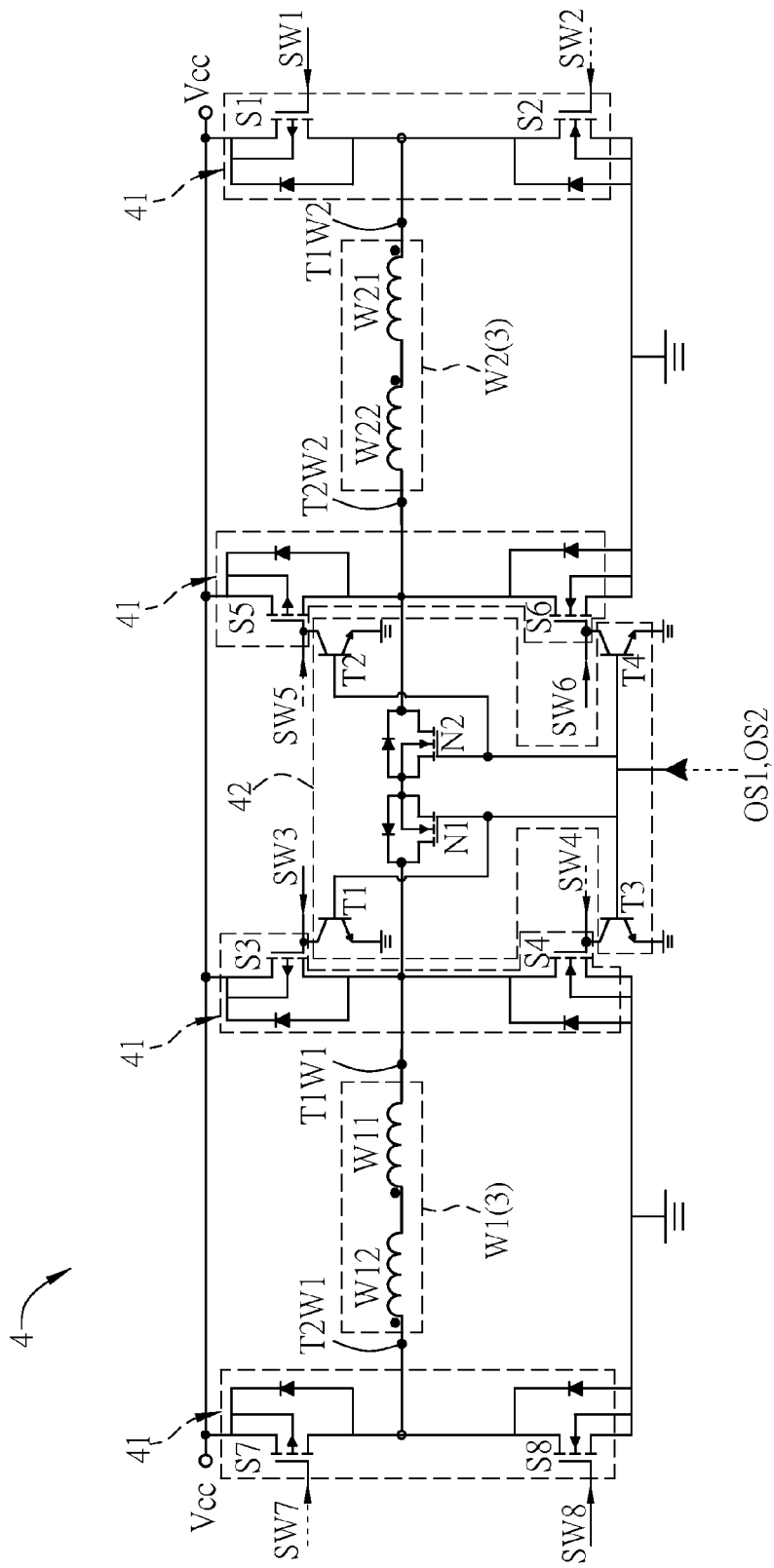
FIG. 3A is a circuit diagram of a driving circuit for driving a motor according to another preferred embodiment of the invention.
Figure 3B:
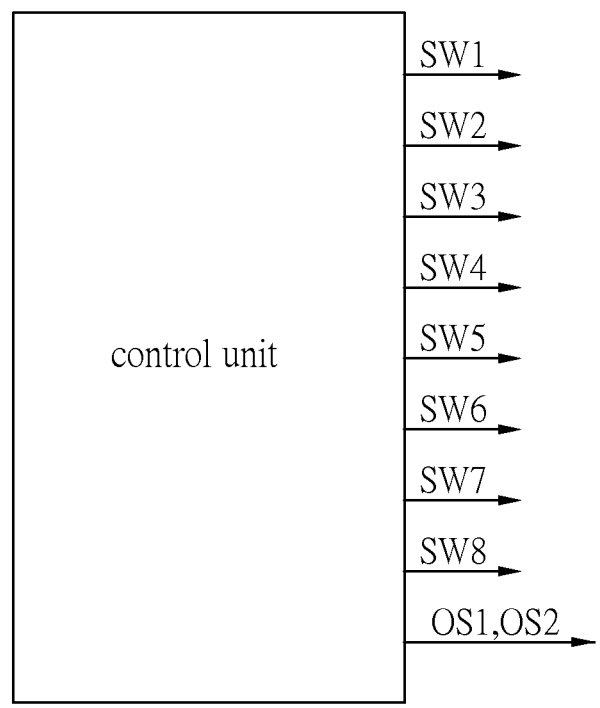
FIG. 3B is schematic diagram of a control unit.

FIG. 3A is a circuit diagram of a driving circuit 4 for driving a motor 3 according to another preferred embodiment of the invention, and FIG. 3B is schematic diagram of a control unit C. Herein, the driving circuit 4 still cooperates and drives the motor 3 as shown in FIG. 1A.

Referring to FIGS. 1B, 3A and 3B, the driving circuit 4 includes a switching unit 41, an operation unit 42 and a control unit C.

The switching unit 41 is coupled to the first coil W1 and the second coil W2. In this embodiment, the switching unit 41 has a first switching element S1, a second switching element S2, a third switching element S3, a fourth switching element S4, a fifth switching element S5, a sixth switching element S6, a seventh switching element S7 and an eighth switching element S8. In this case, the first switching element S1, the third switching element S3, the fifth switching element S5 and the seventh switching element S7 are PMOS transistors, and the second switching element S2, the fourth switching element S4, the sixth switching element S6 and the eighth switching element S8 are NMOS transistors. Of course, in other aspects, each of the switching elements S1-S8 can be individually a PMOS, NMOS or BJT transistor.

The sources of the first switching element S1, the third switching element S3, the fifth switching element S5 and the seventh switching element S7 are connected to a voltage Vcc, and the sources of the second switching element S2, the fourth switching element S4, the sixth switching element S6 and the eighth switching element S8 are grounded. The drains of the first switching element S1 and the second switching element S2 are connected and directly coupled to the first terminal T1W2 of the second coil W2, and the drains of the third switching element S3 and the fourth switching element S4 are connected and directly coupled to the first terminal T1W1 of the first coil W1. The drains of the fifth switching element S5 and the sixth switching element S6 are connected and directly coupled to the second terminal T2W2 of the second coil W2. The drains of the fifth switching element S5 and the sixth switching element S6 are further coupled to the first terminal T1W1 of the first coil W1 through the operation unit 42. The drains of the seventh switching element S7 and the eighth switching element S8 are connected and directly coupled to the second terminal T2W1 of the first coil W1. In addition, the gates of the switching elements S1-S8 can receive the corresponding switching signals SW1-SW8, respectively.

The operation unit 42 is coupled to the switching unit 41, the first coil W1 and the second coil W2. In this embodiment, the operation unit 42 has two operation elements N1 and N2 made of NMOS transistors and four operation elements T1-T4 made of BJT transistors. Herein, the sources of the operation elements N1 and N2 are connected. The drain of the operation element N1 is connected to the first terminal T1W1 of the first coil W1, and the drain of the operation element N2 is connected to the second terminal T2W2 of the second coil W2. The gate of the operation element N2 is connected to the bases of the operation elements T2 and T4. The collector of the operation element T1 is connected to the gate of the third switching element S3, and the emitter of the operation element T1 is grounded. The collector of the operation element T2 is connected to the gate of the fifth switching element S5, and the emitter of the operation element T2 is grounded. The collector of the operation element T3 is connected to the gate of the fourth switching element S4, and the emitter of the operation element T3 is grounded. The collector of the operation element T4 is connected to the gate of the sixth switching element S6, and the emitter of the operation element T4 is grounded. The numbers and transistor types of the operation elements N1-N2 and T1-T4 of the operation unit 42 are for an illustration only. The manufacturer can design different structures and arrangements of the MOS transistors or BJT transistors for achieving the desired function of the operation unit 42.

In this embodiment, the control unit C is mostly the same as the previous embodiment. The different is that the control unit C of this embodiment generates the switching signals SW1-SW8 corresponding to the switching elements S1-S8. Similarly, the switching signals of this embodiment can include the PWM function. The detailed description thereof can be referred to the previous embodiment, so it will be omitted here.

In this embodiment, when the rotation speed of the motor 3 is greater than the predetermined rotation speed R, the control unit C outputs a first operation signal OS1 to the operation unit 42. Then, the operation unit 42 controls to couple the first terminal T1W1 of the first coil W1 to the first terminal T1W2 of the second coil W2 and to couple the second terminal T2W1 of the first coil W1 to the second terminal T2W2 of the second coil W2. The first operation signal OS1 includes the control signals for controlling the operation elements N1-N2 and T1-T4. The first operation signal OS1 has a low level, so the operation elements N1-N2 and T1-T4 are all turned off. Then, the switching signals SW1-SW8 correspondingly control the switching elements S1-S8 of the switching unit 41 so as to couple the first terminal T1W1 of the first coil W1 to the first terminal T1W2 of the second coil W2 and to couple the second terminal T2W1 of the first coil W1 to the second terminal T2W2 of the second coil W2. When the switching signals SW1 and SW6 control to turn on the first switching element S1 and the sixth switching element S6, the switching signals SW2 and SW5 control to turn off the second switching element S2 and the fifth switching element S5, the switching signals SW3 and SW8 control to turn on the third switching element S3 and the eighth switching element S8, and the switching signals SW4 and SW7 control to turn off the fourth switching element S4 and the seventh switching element S7, the current I21 is provided from the voltage Vcc and then grounded through the first switching element S1, the second coil W2 and the sixth switching element S6, and the current I11 is provided from the voltage Vcc and then grounded through the third switching element S3, the first coil W1 and the eighth switching element S8. Alternatively, when the switching signals SW1 and SW6 control to turn off the first switching element S1 and the sixth switching element S6, the switching signals SW2 and SW5 control to turn on the second switching element S2 and the fifth switching element S5, the switching signals SW3 and SW8 control to turn off the third switching element S3 and the eighth switching element S8, and the switching signals SW4 and SW7 control to turn on the fourth switching element S4 and the seventh switching element S7, the current I22 is provided from the voltage Vcc and then grounded through the fifth switching element S5, the second coil W2 and the second switching element S2, and the current I12 is provided from the voltage Vcc and then grounded through the seventh switching element S7, the first coil W1 and the fourth switching element S4. In this configuration that the first terminal T1W1 of the first coil W1 is coupled to the first terminal T1W2 of the second coil W2 and the second terminal T2W1 of the first coil W1 is coupled to the second terminal T2W2 of the second coil W2, the motor 3 can provide high power output to be applied to high rotation speed operation.

When the rotation speed of the motor 3 is less than or equal to the predetermined rotation speed R, the control unit C outputs a second operation signal OS2 to the operation unit 42. Then, the operation unit 42 controls to couple the second terminal T2W1 of the first coil W1 to the first terminal T1W2 of the second coil W2. The second operation signal OS2 includes the control signals for controlling the operation elements N1-N2 and T1-T4. The second operation signal OS2 has a high level, so the operation elements N1-N2 and T1-T4 are all turned on so as to ground the gates of the switching elements S3-S6. Accordingly, the second terminal T2W1 of the first coil W1 is coupled to the first terminal T1W2 of the second coil W2. When the switching signals SW1 and SW8 control to turn on the first switching element S1 and the eighth switching element S8, and the switching signals SW2 and SW7 control to turn off the second switching element S2 and the seventh switching element S7, the current I1 is provided from the voltage Vcc and then grounded through the first switching element S1, the second coil W2, the first coil W1 and the eighth switching element S8. Alternatively, when the switching signals SW1 and SW8 control to turn off the first switching element S1 and the eighth switching element S8, and the switching signals SW2 and SW7 control to turn on the second switching element S2 and the seventh switching element S7, the current I2 is provided from the voltage Vcc and then grounded through the seventh switching element S7, the first coil W1, the second coil W2 and the second switching element S2. In this configuration that the second terminal T2W1 of the first coil W1 is coupled to the first terminal T1W2 of the second coil W2, the motor 3 can provide lower power output to be applied to medium-low rotation speed operation.

To be noted, similar to the above-mentioned driving circuit 2, in the driving circuit 4, no matter the first terminals T1W1 and T1W2 of the first and second coils W1 and W2 are coupled and the second terminals T2W1 and T2W2 of the first and second coils W1 and W2 are coupled, or the second terminal T2W1 of the first coil W1 is coupled to the first terminal T1W2 of the second coil W2, the current flowing through the first coil W1 and the second coil W2 must be maintained in the same current direction and time sequence.

Figure 4:
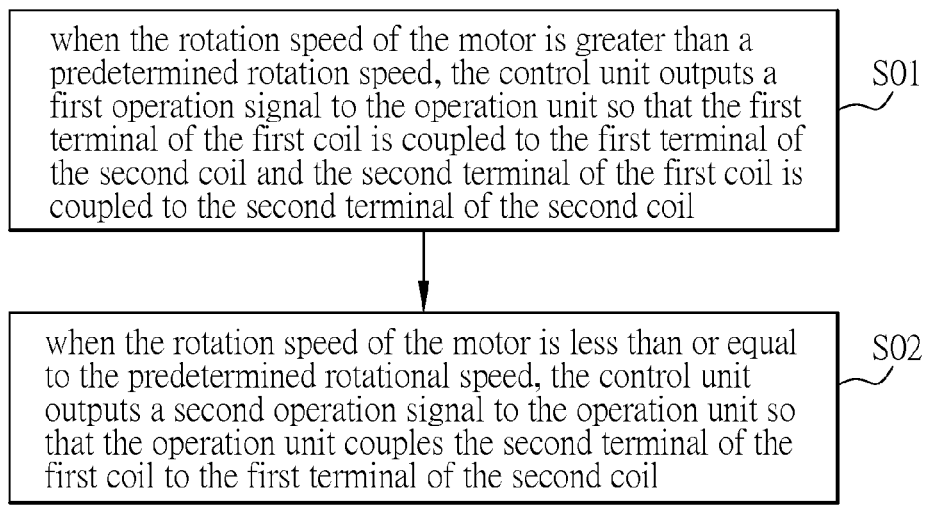
FIG. 4 is a flow chart of a driving method according to a preferred embodiment of the invention.

FIG. 4 is a flow chart of a driving method according to a preferred embodiment of the invention. The driving method of the invention will be discussed with reference to FIGS. 1A-2B and 4.

The driving method of the invention is, for example, applied to a driving circuit 2 (or driving circuit 4) for a single-phase brushless DC fan so as to drive a motor 3 including a first coil W1 and a second coil W2. The first coil W1 has a first terminal T1W1 and a second terminal T2W1, and the second coil W2 has a first terminal T1W2 and a second terminal T2W2. The driving circuit 2 includes a switching unit 21, an operation unit 22 and a control unit C. The technical description and driving procedure have been disclosed in the above embodiments, so the detailed description thereof will be omitted.

With reference to FIG. 4, the driving method includes the steps S01 and S02.

In the step S01, when the rotation speed of the motor 3 is greater than a predetermined rotation speed R, the control unit C outputs a first operation signal OS1 to the operation unit 22 so that the first terminal T1W1 of the first coil W1 is coupled to the first terminal T1W2 of the second coil W2 and the second terminal T2W1 of the first coil W1 is coupled to the second terminal T2W2 of the second coil W2. In the step S02, when the rotation speed of the motor 3 is less than or equal to the predetermined rotational speed R, the control unit C outputs a second operation signal OS2 to the operation unit 22 so that the operation unit 22 couples the second terminal T2W1 of the first coil W1 to the first terminal T1W2 of the second coil W2. As shown in FIG. 1A, the operation unit 22 includes a first operation element 221 and a second operation element 222 for implementing the above coupling. The details of driving method have been described in the above embodiment, so the description thereof will be omitted.

To sum up, in the driving circuit and driving method of the invention, when the detected rotation speed of the motor is greater than a predetermined rotation speed, the control unit controls the operation unit so as to couple the first terminal of the first coil to the first terminal of the second coil and to couple the second terminal of the first coil to the second terminal of the second coil (applied to high rotation speed). Alternatively, when the detected rotation speed of the motor is less than or equal to the predetermined rotational speed, the control unit controls the operation unit so as to couple the second terminal of the first coil to the first terminal of the second coil (providing lower power output to be applied to medium-low rotation speed). Accordingly, the invention can change the coupling arrangement of the coils while the motor is operated at a medium-low rotation speed, thereby further reducing the power consumption so as to achieve the goal of power saving.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A driving circuit for a single-phase brushless DC fan, which is used for driving a motor containing a first coil and a second coil, each of which comprises a first terminal and a second terminal, the driving circuit comprising:
    a switching unit coupled with the first coil and the second coil;
    an operation unit coupled with the switching unit, the first coil and the second coil; and
    a control unit generating a switching signal, wherein the switching unit receives the switching signal for driving the motor, and the control unit detects a rotation speed of the motor,
    wherein, when the rotation speed of the motor is greater than a predetermined rotation speed, the control unit outputs a first operation signal to the operation unit so that the first terminal of the first coil is coupled to the first terminal of the second coil and the second terminal of the first coil is coupled to the second terminal of the second coil, and
    when the rotation speed of the motor is less than or equal to the predetermined rotational speed, the control unit outputs a second operation signal to the operation unit so that the operation unit couples the second terminal of the first coil to the first terminal of the second coil.

2. The driving circuit of claim 1, wherein the switching unit has a first switching element, a second switching element, a third switching element and a fourth switching element, and the switching signal controls to turn on the first switching element and the fourth switching element and to turn off the second switching element and the third switching element.

3. The driving circuit of claim 1, wherein the switching unit has a first switching element, a second switching element, a third switching element and a fourth switching element, and the switching signal controls to turn off the first switching element and the fourth switching element and to turn on the second switching element and the third switching element.

4. The driving circuit of claim 1, wherein the switching unit has a first switching element, a second switching element, a third switching element, a fourth switching element, a fifth switching element, a sixth switching element, a seventh switching element and an eighth switching element, and the switching signal controls to turn on the first switching element, the third switching element, the sixth switching element, and the eighth switching element and to turn off the second switching element, the fourth switching element, the fifth switching element, and the seventh switching element.

5. The driving circuit of claim 1, wherein the switching unit has a first switching element, a second switching element, a third switching element, a fourth switching element, a fifth switching element, a sixth switching element, a seventh switching element and an eighth switching element, and the switching signal controls to turn off the first switching element, the third switching element, the sixth switching element, and the eighth switching element and to turn on the second switching element, the fourth switching element, the fifth switching element, and the seventh switching element.

6. A driving method applied to a driving circuit of a single-phase brushless DC fan, which is used for driving a motor containing a first coil and a second coil, each of which comprises a first terminal and a second terminal, the driving circuit comprises a switching unit, an operation unit and a control unit, the switching unit is coupled with the first coil and the second coil, the operation unit is coupled with the switching unit, the first coil and the second coil, the control unit generates a switching signal, the switching unit receives the switching signal for driving the motor, and the control unit detects a rotation speed of the motor, the driving method comprising:

when the rotation speed of the motor is greater than a predetermined rotation speed, outputting a first operation signal from the control unit to the operation unit so that the first terminal of the first coil is coupled to the first terminal of the second coil and the second terminal of the first coil is coupled to the second terminal of the second coil; and when the rotation speed of the motor is less than or equal to the predetermined rotational speed, outputting a second operation signal from the control unit to the operation unit so that the operation unit couples the second terminal of the first coil to the first terminal of the second coil.

7. The driving method of claim 6, wherein the switching unit has a first switching element, a second switching element, a third switching element and a fourth switching element, and in the step of receiving the switching signal by the switching unit, the switching signal controls to turn on the first switching element and the fourth switching element and to turn off the second switching element and the third switching element.

8. The driving method of claim 6, wherein the switching unit has a first switching element, a second switching element, a third switching element and a fourth switching element, and in the step of receiving the switching signal by the switching unit, the switching signal controls to turn off the first switching element and the fourth switching element and to turn on the second switching element and the third switching element.

9. The driving method of claim 6, wherein the switching unit has a first switching element, a second switching element, a third switching element, a fourth switching element, a fifth switching element, a sixth switching element, a seventh switching element and an eighth switching element, and in the step of receiving the switching signal by the switching unit, the switching signal controls to turn on the first switching element, the third switching element, the sixth switching element, and the eighth switching element and to turn off the second switching element, the fourth switching element, the fifth switching element, and the seventh switching element.

10. The driving method of claim 6, wherein the switching unit has a first switching element, a second switching element, a third switching element, a fourth switching element, a fifth switching element, a sixth switching element, a seventh switching element and an eighth switching element, and in the step of receiving the switching signal by the switching unit, the switching signal controls to turn off the first switching element, the third switching element, the sixth switching element, and the eighth switching element and to turn on the second switching element, the fourth switching element, the fifth switching element, and the seventh switching element.

* * * * *